United States Patent [19]

Friedlander et al.

[11] Patent Number: 5,942,556
[45] Date of Patent: *Aug. 24, 1999

[54] STABILIZED RADIATION CURABLE COMPOSITIONS BASED ON UNSATURATED ESTER AND VINYL ETHER COMPOUNDS

[75] Inventors: Charles B. Friedlander, Shaler Twp., Allegheny County; Ronald R. Ambrose, Hampton Twp., Allegheny County; David A. Diehl, Ross Twp., Allegheny County; Alan B. Weissberg, Allegheny County; Carolyn A. Novak, Richland Twp., Allegheny County, all of Pa.

[73] Assignee: PPG Industries Ohio, Inc., Cleveland, Ohio

[ * ] Notice: This patent is subject to a terminal disclaimer.

[21] Appl. No.: 08/757,271

[22] Filed: Nov. 27, 1996

[51] Int. Cl.$^6$ .............................. C08F 2/50; C08K 5/524; C08L 67/07
[52] U.S. Cl. ................................ 522/76; 522/93; 522/96; 522/97; 522/104; 522/107; 522/179; 522/181; 523/506; 524/147; 524/148; 524/151; 524/153; 526/323; 526/333; 252/400.21; 252/400.24
[58] Field of Search ............................. 522/76, 107, 104, 522/96, 93, 97, 181, 179; 526/323, 333; 523/506; 524/147, 148, 151, 153; 252/400.21, 400.24

[56] References Cited

U.S. PATENT DOCUMENTS

| | | | |
|---|---|---|---|
| 3,616,366 | 10/1971 | Passalenti et al. | 522/107 |
| 3,814,702 | 6/1974 | Bourdon et al. | 252/426 |
| 4,017,652 | 4/1977 | Gruber | 427/54 |
| 4,116,788 | 9/1978 | Schmitt et al. | 204/159.23 |
| 4,751,273 | 6/1988 | Lagin et al. | 825/488 |
| 4,775,723 | 10/1988 | Kuhne et al. | 525/327.7 |
| 4,929,654 | 5/1990 | Wang et al. | 524/117 |
| 5,200,490 | 4/1993 | Jaeger et al. | 528/49 |
| 5,286,835 | 2/1994 | Green et al. | 528/272 |
| 5,334,455 | 8/1994 | Noren et al. | 428/413 |
| 5,334,456 | 8/1994 | Noren et al. | 428/431 |
| 5,340,653 | 8/1994 | Noren et al. | 428/423.1 |
| 5,445,877 | 8/1995 | Kawakami et al. | 428/283 |
| 5,514,727 | 5/1996 | Green et al. | 522/107 |
| 5,534,559 | 7/1996 | Leppard et al. | 522/182 |
| 5,536,760 | 7/1996 | Friedlander et al. | 522/96 |

*Primary Examiner*—Susan W. Berman
*Attorney, Agent, or Firm*—Paul S. Chirgott

[57] ABSTRACT

Disclosed is a radiation curable composition which includes: (a) an unsaturated ester compound, and (b) a pulverizable vinyl ether compound. The unsaturated ester compound is characterized as having a plurality of unsaturated ester groups per molecule. The pulverizable vinyl ether compound is characterized as including at least one of the following: (a) a compound having an average of greater than 1.0 reactive vinyl ether groups per molecule, and (b) a vinyl ether-containing group bonded to the unsaturated ester compound such that there is an average of at least 1.0 reactive vinyl ether group per molecule. The unsaturated ester compound, the vinyl ether compound and/or a mixture thereof is treated with a reducing agent so as to decompose destabilizing agents present therein that would initiate premature polymerization of the vinyl ether compound. Accordingly, in the stabilized radiation curable coating compositions of this invention, polymerization of the vinyl ether compound is substantially avoided until blended with the unsaturated ester compound and exposed to radiation.

21 Claims, No Drawings

STABILIZED RADIATION CURABLE COMPOSITIONS BASED ON UNSATURATED ESTER AND VINYL ETHER COMPOUNDS

BACKGROUND OF THE INVENTION

The technical field of the present invention relates to radiation curable compositions. Particularly, it relates to radiation curable coating compositions containing unsaturated polyester compounds in combination with vinyl ether compounds.

There are a number of coating applications requiring the use of coating compositions that cure rapidly, adhere well to a substrate and do not discolor during the curing process. In some instances, radiation curable coating compositions can be used to meet these objectives.

The basic chemistry of radiation curing involves a rapid polymerization of unsaturated materials initiated by free radicals formed when the system is irradiated by ionizing radiation and/or actinic radiation (hereinafter individually and collectively referred to as "radiation"). One of the major components of many conventional radiation curable coating compositions are acrylates or methacrylates (hereinafter individually and collectively referred to as "(meth) acrylates").

Notwithstanding the widespread use of radiation curable coating compositions which include (meth)acrylates as one of their major components, there are problems associated therewith. For example, their cure response is significantly inhibited by the presence of oxygen in the curing atmosphere. Moreover, there are also concerns with the possibility of skin and eye irritation sometimes associated with their the used and/or handling. For these and other reasons, it is becoming desirable in the coating industry to reduce and/or eliminate the amount of (meth)acrylates present in radiation curable coating compositions.

One alternative to such conventional radiation curable coating compositions is disclosed in commonly-owned U.S. Pat. No. 5,536,760. Specifically, that patent discloses radiation curable coating compositions having, as their major components, ethylenically unsaturated ester compounds having a plurality of unsaturated ester groups and polymerizable vinyl ether compounds. In one preferred embodiment of that patent, the unsaturated ester compounds are polyunsaturated polyesters having more than 2.0 unsaturated ester groups per molecule.

Coatings produced in accordance with U.S. Pat. No. 5,536,760 have a relatively fast cure response when exposed to radiation. If a large number of ethylenically unsaturated groups are present in the unsaturated ester compounds, the coatings disclosed therein have the potential of being hard and brittle. Although there are many applications where properties such as hardness and brittleness are highly desirable, it is sometimes equally desirable for radiation-cured coating composition to be hard and flexible. Moreover, notwithstanding their relatively fast cure response, it is also often desirable to even further accelerate the cure rates of such coating compositions.

Often times, accelerating cure responses reduces the coating composition's stability. For example, if accelerated cure responses are achieved by selecting and/or employing components that are more readily polymerizable when exposed to radiation, these same components are typically more susceptible to self polymerization and/or to initiate the polymerization of other components prior to radiation exposure. On the other hand, if components are selected and/or employed that are less readily polymerizable until exposed to radiation, these same components typically reduce the coating composition's cure response.

U.S. Pat. No. 3,814,702 pertains to unsaturated polyester-based radiation curable coatings containing a photosensitizing composition which includes: a highly sensitive polymerization initiator (i.e., a benzoin compound), an organic acid which activates the benzoin compound, and a solvent capable of solubilizing the benzoin compound and the acid. According to that patent, the addition of such a photosensitizing composition to the unsaturated polyester-based coating improves the coating's cure response and stability. That patent also discloses that a weak reducing agent (e.g., an organic phosphite compound) added to the photosensitizing composition can improve the coating's stability, as well as enhance the performance of the photosensitizing composition.

Contrary to the disclosure in U.S. Pat. No. 3,814,702, U.S. Pat. No. 4,116,788 discloses that, in customary unsaturated polyester-based coatings which contain a benzoin photosensitizing composition, photopolymerization time is not shortened by adding an organic phosphite compound. The radiation curable coating compositions disclosed in U.S. Pat. No. 4,116,788 contain (meth)acrylic acid esters as one of their major components. According to that patent, the addition of a benzoin compound and an organic phosphite compound to the radiation curable compositions disclosed therein improves the coating's cure response and stability.

SUMMARY OF THE INVENTION

One object of the present invention is to provide stabilized radiation curable coating compositions which do not require the use of (meth)acrylates as one of their major components.

Another object of the present invention is to provide a stabilized radiation curable coating compositions having an improved cure response.

Still another object of the present invention is to provide substrates having cured thereon at least one film comprising the stabilized radiation curable coating compositions of the present invention.

These and other objects are achieved by the advent of a stabilized, radiation curable coating compositions which include: (a) an unsaturated ester compound having a plurality of unsaturated ester groups per molecule; and (b) a polymerizable vinyl ether compound. In accordance with this invention, the unsaturated ester compound, the vinyl ether compound and/or a mixture thereof are blended with a reducing agent so as to decompose at least some of any destabilizing agents present therein and enhance the coating's cure response.

After being blended with the reducing agents, the radiation curable coating compositions of this invention are stabilized to the extent that polymerization of the vinyl ether compounds is substantially avoided until blended with the unsaturated ester compound and exposed to radiation.

The present invention also provides substrates having cured thereon a film of stabilized radiation curable coating compositions described above.

DETAILED DESCRIPTION OF THE INVENTION

The term "unsaturated ester compound" as used herein refers to a polymer(s) and/or oligomer(s) having a plurality of unsaturated ester groups per molecule.

The terms "polymerizable vinyl ether compound" and "polymerizable urethane vinyl ether compound" as used herein refer to compounds having vinyl ether groups which can react, upon exposure to radiation, with the ethylenic unsaturation of the unsaturated ester compound.

The present invention pertains to radiation curable coating compositions which include two basic components: (a) an unsaturated ester compound having a plurality of unsaturated ester groups per molecule; and (b) a polymerizable vinyl ether compound. These component are individually and/or collectively blended with a reducing agent so as to decompose compounds that would destabilize the coating composition and/or any of its components (hereinafter, referred to as "destabilizing agents"). Examples of compounds that would destabilize the coating compositions prepared in accordance with this invention and/or their components are oxidizing agents. Specifically, the presence of a sufficient amount of oxidizing agents (e.g., peroxides and hydroperoxides) in the vinyl ether compound may initiate polymerization prior to their being blended together and exposed to radiation. Moreover, even if the vinyl ether compound is essentially free of oxidizing agents, the presence of oxidizing agents in the unsaturated ester compound may still cause premature polymerization when they are mixed together.

Reducing agents which can be used to stabilize the radiation curable coating compositions prepared in accordance with this invention and/or their components are those which, while being able to decompose destabilizing agents, do not adversely affect the properties of the compounds which they are being blended with and/or the resulting radiation curable coating composition. Examples of such reducing agents include organic phosphites such as: dimethyl-phosphite, dioctyl-phosphite, diphenyl-phosphite, tri-octyl-phosphite, tri-stearyl-phosphite, trimethyl-phosphite, triethyl-phosphite, tri-isopropyl-phosphite, tris-allyl-phosphite, didecyl-phenyl-phosphite, tri-phenyl-phosphite, tris-4-nonylphenyl-phosphite, tris-4-chlorophenyl-phosphite, trilaurylthio-phosphite, tetraphenyl-dipropylene-glycol-diphosphite, and mixtures thereof.

If the mixture of the unsaturated ester and vinyl ether compounds is prepared and handled in a manner so as to keep it essentially free of oxidizing agents prior to being exposed to radiation, then it is only preferable to blend reducing agents with those compounds which are not prepared and/or handled in a manner so as to keep them essentially free of destabilizing agents. The amount of a reducing agent necessary to decompose the total amount of destabilizing agents that are, or may be, present in the coating composition and/or its individual components can be added to any one or more of the coating's components and/or any mixture thereof. However, if all of the reducing agent is added to either the unsaturated ester or the vinyl ether compound, this may not prevent the premature polymerization since the compound to which reducing agents has not been added may contain destabilizing agents. Preferably, each of the compounds are individually blended with reducing agents.

The amount of reducing agent employed is that which is necessary to decompose at least some of the destabilizing agents which are, or may be, present in the individual compounds and/or any mixture thereof. Typically, the reducing agent is employed in an amount which is necessary to decompose more than 50% of the destabilizing agents present in the individual compounds and/or any mixture thereof, preferably at least 70%, more preferably at least 90%, and even more preferably, at least 95%.

The amount of reducing agent typically employed is at least about 0.05 weight percent of the respective compound's total resin solids. If the compounds are blended together prior to being treated with a reducing agent, the amount of reducing agent employed is typically at least about 0.05 weight percent of the blend's total resin solids. Preferably, the amount of reducing agent employed ranges from about 0.05 to about 10 weight percent, more preferably from about 0.1 to about 6 weight percent, and even more preferably from about 0.5 to 3 weight percent. These weight percentages are based upon the respective compound's total resin solids or the blend's total resin solids.

When destabilizing agents are present in the unsaturated ester and/or vinyl ether compounds, reducing agents are preferably permitted to react separately with the contaminated compound(s) for a time sufficient to decompose the oxidizing agents present therein. Dwell time for such a treatment process is temperature dependent. For example, sufficient treatment dwell times typically range from about 1 hour at 100° C. to about 24 hours at ambient temperature, preferably from about 2 hours at 100° C. to about 36 hours at ambient temperatures, and more preferably from about 3 hours at 100° C. to about 48 hours at ambient temperatures.

The unsaturated ester compound which can be used when practicing this invention includes hydroxy functional unsaturated polycarboxylates, polycaprolactones, and the like. In a preferred embodiment, the unsaturated ester compound is a hydroxy functional unsaturated polycarboxylate which is the esterification product of an ethylenically unsaturated carboxylic acid and a polyhydric alcohol.

Unsaturated carboxylic acids which can be used in preparing such preferred unsaturated ester compound include unsaturated carboxylic acids having an acid functionality of at least two and/or their corresponding anhydrides. Examples of such unsaturated carboxylic acids and/or their anhydrides which can be used for this purpose include: maleic acid, maleic anhydride, fumaric acid and itaconic acid.

Since it is readily available and relatively inexpensive, maleic anhydride is economically desirable. However, since maleate esters do not copolymerize with vinyl ethers as readily as fumarate esters (e.g., esters derived from fumaric acid), fumarate esters are preferred for making the unsaturated ester compound of the present invention when increased cure response is an objective.

The unsaturated carboxylic acids used in preparing the aforementioned preferred unsaturated ester compound can also be blended with saturated carboxylic acids. Examples of saturated carboxylic acids which can be used for this purpose include: phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid and mixtures thereof. Moreover, anhydrides of the saturated carboxylic acids, where they exist, can also be used for this purpose.

Polyhydric alcohols which can be used in preparing the aforementioned preferred unsaturated ester compound include: diethylene glycol, ethylene glycol, propylene glycol, dipropylene glycol, butylene glycol, glycerol, trimethylolpropane, pentaerythritol, sorbitol, 1,6-hexanediol, 1,4-cyclohexanediol, 1,4-cyclohexane-dimethanol, 1,2-bis(hydroxyethyl)cyclohexane, and 2,2-dimethyl-3-hydroxypropyl-2,2-dimethyl-3-hydroxypropionate, neopentyl glycol, 2-methyl-1,3-propane diol and the like and/or mixtures thereof.

Preferably, the polyhydric alcohols which are used in preparing the aforementioned preferred unsaturated ester compound are diols. Specifically, while polyols having a hydroxyl functionality greater than two may be used for this purpose, it is preferred that the major portion, if not all, of the unsaturated ester compounds used in this invention be comprised of linear, unsaturated polyester molecules. Since it is readily available and relatively inexpensive, diethylene glycol is a particularly preferred diol which can be used for this purpose.

The polyhydric alcohols used in preparing the aforementioned preferred unsaturated ester compound can also be blended with monohydric alcohols. Examples of monohydric alcohols that can be used for this purpose include $C_1$ to $C_{15}$ alcohols.

The molecular weight of the unsaturated ester compound employed when practicing this invention can vary widely. However, as measured by gel permeation chromatography (hereinafter "GPC") using a polystyrene standard, the unsaturated ester compound typically has a peak molecular weight ranging from about 500 to about 50,000; preferably from about 600 to about 25,000; more preferable from about 700 to about 10,000; and even more preferably from about 800 to about 5,000.

The unsaturated ester compound can be prepared by a number of different procedures known to those skilled in the art. In one preferred embodiment, the unsaturated ester compound is prepared by heating a mixture of an unsaturated carboxylic acid or a blend of an unsaturated and saturated carboxylic acid with a polyhydric alcohol or a blend of a monohydric and polyhydric alcohol for about 1 to about 10 hours at temperatures ranging from about 150° C. to about 250° C., with water formed during the esterification being distilled off using a sparge of an inert gas such as nitrogen. Esterification catalysts, which increase the rate of such a reaction, can also be used in this process. Examples of suitable esterification catalysts include: para-toluenesulfonic acid, butylstannoic acid, dibutyltin oxide, stannous fluoride and stannous octoate.

The coating compositions prepared in accordance with this invention also include a polymerizable vinyl ether compound. The polymerizable vinyl ether compounds of this invention can react with the unsaturated ester compound and include: (a) compounds which have an average of greater than 1.0 reactive vinyl ether groups per molecule and/or (b) a vinyl ether-containing group bonded to the unsaturated ester compound such that the resulting compound has have an average of at least 1.0 reactive vinyl ether group per molecule. The vinyl ether groups of the polymerizable vinyl ether compound are different from, and cocurable with, the ethylenically unsaturated moieties in the backbone of the unsaturated ester compound (e.g., those provided from the residue of the unsaturated carboxylic acid used in making an unsaturated polyester polymer and/or oligomer).

Examples of compounds containing greater than 1.0 reactive vinyl ether groups per molecule include vinyl ethers made in known manners from di-, tri-, or tetrafunctional polyols, acetylene and a basic catalyst under pressure. It also includes vinyl ether terminated polyesters such as those made in accordance with the processes disclosed in U.S. Pat. No. 5,286,835. Specific examples of such compounds include: tripropylene glycol divinyl ether, diethylene glycol divinyl ether, 1,4-butanediol divinyl ether, tetraethylene glycol divinyl ether, triethylene glycol divinyl ether, trimethylolpropane trivinyl ether, polytetrahydrofuran divinyl ether, vinyl ether terminated polyesters and the like, and combinations thereof. Triethylene glycol divinyl ether is the preferred vinyl ether compound for use in this invention.

One example of a compound having at least 1.0 reactive vinyl ether-containing group bonded to the unsaturated ester compound which can be used when practicing this invention can be made by polymerizing a hydroxy-functional vinyl ether (e.g., hydroxybutyl vinyl ether) with a polyisocyanate (e.g., isophorone diisocyanate) to form a half-capped isocyanate adduct. Thereafter, residual isocyanato functionality of the half-capped adduct is reacted with the hydroxyl functionality of an unsaturated polyol so as to structurally incorporate of at least 1.0 reactive vinyl ether groups in the unsaturated ester compound. Examples of unsaturated carboxylic acids, unsaturated carboxylic acid anhydrides and polyols which are suitable for preparing such hydroxyl-functional unsaturated polyester resins include those described herein previously. Examples of polyisocyanates which can be used for this purpose include: toluene-2,4-diisocyanate, toluene-2,6-diisocyanate; diphenylmethane-4,4'-diisocyanate, diphenylmethane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate; methylcyclohexyl diisocyanate; hexahydrotoluene-2,4-diisocyanate, hexahydrotoluene-2,6-diisocyanate; hexahydrophenylene-1,3-diisocyanate, hexahydrophenylene-1,4-diisocyanate; perhydrodiphenylmethane-2,4'-diisocyanate, perhydrodiphenyl-methane4,4'-diisocyanate, 4,4'- methylene-bis-(cyclohexyl isocyanate) and the like, and/or mixtures thereof. The resulting unsaturated ester compounds contain urethane moieties and are usually free of unreacted isocyanate groups.

The vinyl ether compound can also include a blend of a compound having an average of greater than 1.0 reactive vinyl ether groups per molecule and a compound having at least 1.0 reactive vinyl ether-containing groups bonded to the unsaturated ester compound. Examples of both such compounds include those previously described herein.

In addition to the unsaturated ester and vinyl ether compounds, stabilized radiation curable coatings of this invention preferably contain a polymerizable urethane vinyl ether compound that can also react with the unsaturated ester compound. Urethane vinyl ether compounds which can be used with this invention have a saturated, urethane-containing backbone with vinyl ether groups linked thereto.

The urethane vinyl ether compound used when practicing this invention can be produced conventionally by reacting a vinyl ether compound having hydroxyl group and/or amine group functionality with a compound having a saturated, urethane-containing backbone and isocyanate functionality. For urethane vinyl ether compounds prepared in such a conventional manner, the compound having the saturated, urethane-containing backbone is typically made by the polymerizing polyisocyanates with saturated, hydroxy-functional compounds. Examples of saturated, hydroxy-functional compounds which can be used for this purpose include: polyesters, polycarbonates, polycaprolactones, polyethers, bisphenol A alkoxylates and siloxanes.

In one preferred embodiment for making the urethane vinyl ether compound used when practicing this invention, the saturated, hydroxy-functional compound comprises a saturated polyester which includes soluble reaction products of saturated polycarboxylic acids (or their anhydrides) with polyols. Examples of suitable saturated polycarboxylic acids and anhydrides which can be used for this purpose include: phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethyl succinic acid, 3,3-dimethylglutaric acid, 2,2-dimethyl glutaric acid, anhydrides thereof and/or mixtures thereof. Moreover, examples of polyols that can be used for this purpose include: diethylene glycol, ethylene glycol, propylene glycol, dipropylene glycol, butylene glycol, glycerol, trimethylolpropane, pentaerythritol, sorbitol, 1,6-hexanediol, 1,4-cyclohexanediol, 1,4-cyclohexane-dimethanol, 1,2-bis (hydroxyethyl)cyclohexane, and 2,2-dimethyl-3-hydroxypropyl-2,2-dimethyl-3-hydroxypropionate, neopentyl glycol, $^2$-methyl-1,3-propane diol and the like and/or mixtures thereof.

The vinyl ether compound which reacts with the aforementioned compounds having a saturated urethane-containing backbone have hydroxyl group and/or amine group functionality. Preferably, such vinyl ether compounds have hydroxyl group functionality. Examples of hydroxy-functional vinyl ether compounds which can be used for this purpose include: triethylene glycol monovinyl ether; 1,4-cyclohexane dimethylol monovinyl ether, 1-methyl-3-hydroxypropyl vinyl ether, 4-hydroxybutyl vinyl ether and mixtures thereof. For processing and commercial reasons, the preferred hydroxy-functional vinyl ether compound used to produce the urethane vinyl ether compounds of this invention is 4-hydroxybutyl vinyl ether.

In the urethane vinyl ether compound, the groups linking the vinyl ether groups to the saturated, urethane-containing backbone component is typically at least one of the following: urethane, urea, ester, ether and thio groups. Examples of preferred linking groups include urethane, urea and/or ester groups. More preferably, the linking groups are urethanes.

Urethane vinyl ether compounds can also be prepared by polymerizing a hydroxy-functional vinyl ether (e.g., hydroxybutyl vinyl ether) with a polyisocyanate (e.g., isophorone diisocyanate) to form a half-capped diisocyanate adduct. Thereafter, residual isocyanato functionality of the half-capped adduct is reacted with the hydroxyl functionality of a saturated polyol so as to structurally incorporate an average of at least 1.0 reactive vinyl ether groups per molecule.

The molecular weight of the urethane vinyl ether compound used when practicing this invention can vary widely. Typically, it has a peak molecular weight, as measured by GPC using a polystyrene standard, ranging from about 200 to about 50,000; preferably from about 300 to about 25,000; more preferably from about 400 to about 15,000; and even more preferably from about 500 to about 5,000.

Since the urethane vinyl ether compounds which can be used in the stabilized radiation curable coatings of this invention can also polymerize prematurely when in the presence of destabilizing agents, (e.g., oxidizing agents), it is preferred to also blend this component, when present, with a reducing agent. The reducing agents, amounts, and dwell times which are associated with the optional urethane vinyl ether component are the same as those previously described herein for the unsaturated ester and vinyl ether compounds.

In the radiation curable coating compositions of the present invention, the ratio of the sum of the carbon—carbon double bond equivalents from the vinyl ether compound (and urethane vinyl ether compounds, if present) to the carbon—carbon double bond equivalents from the unsaturated ester compound typically ranges from about 0.1:1 to about 1.5:1; preferably from about 0.2:1 to about 1.4:1; and more preferably from about 0.3:1 to about 1.2:1. However, for many coating purposes, it is often desirable that the aforesaid ratio of carbon—carbon double bond equivalents be approximately 1:1.

If the optional urethane vinyl ether compound is present, that portion of the total carbon—carbon double bond equivalents provided solely by vinyl ether compound typically ranges from about 1% to about 99%; preferably from about 15% to about 97%; more preferably from about 35% to about 95%; and even more preferably form about 50% to about 90%.

The unsaturated ester and vinyl ether compounds (and the urethane vinyl ether compound, if present) are employed in the stabilized radiation curable composition of the present invention in relative amounts to obtain the desired ratio of carbon—carbon double bond equivalents so as to provide crosslinking via reaction of ethylenic unsaturation provided from the unsaturated ester compound with vinyl unsaturation provided by the vinyl ether compound (and urethane vinyl ether compound, if present) upon free-radical curing of the composition (e.g., when exposed to radiation).

The coating compositions of the present invention can be cured by various conventional means known to those skilled in the art. For example, the coating compositions can be cured by exposure to ionizing radiation (e.g., by electron beam), actinic energy (e.g., by ultraviolet light) and/or thermal energy (e.g., heat). Notwithstanding the above, the preferred method of curing the coating compositions of the present invention is by exposure to radiation (e.g., ionizing and/or actinic radiation).

Ionizing radiation is radiation having energy at least sufficient to produce ions either directly or indirectly in a medium such as air or water. Examples of ionizing radiation sources include accelerated electrons as produced by generally known electron beam devices. When electron beam devices are used to cure coating compositions prepared in accordance with this invention, the energy of the accelerated electrons typically ranges from about 50,000 electron volts to about 300,000 electron 30 volts. The amount of ionizing radiation in rads for curing a composition of the invention will vary depending on factors such as the particular formulation of the radiation curable composition, thickness of the applied layer of coating composition on the substrate, temperature of the composition, and the like.

One advantage of coating compositions prepared in accordance with this invention is their excellent degree of cure at low doses of ionizing radiation. Generally, a 1 mil (25 micron) thick wet film of a coating composition of this invention can be cured in the presence of oxygen through its thickness to a tack-free state upon exposure to from about 0.5 to about 5 megarads of ionizing radiation.

Actinic radiation is light with wavelengths of electromagnetic radiation ranging from the ultraviolet light range, through the visible light range, and into the infrared range. Actinic radiation which can be used to cure coating compositions of this invention generally has wavelengths of electromagnetic radiation ranging from about 150 to about 2,000 nanometers (nm), preferably from about 180 to about 1,000 nm, and more preferably from about 200 to about 500 nm.

Many of the ultraviolet light sources generally known in the art can be used to cure the radiation curable coatings of this invention. Examples of such include: mercury arcs, carbon arcs, low pressure mercury lamps, medium pressure mercury lamps, high pressure mercury lamps, swirl-flow plasma arcs and ultraviolet light emitting diodes. Preferably, ultraviolet light-emitting lamps of the medium pressure mercury vapor type are employed when practicing this invention. Such lamps usually have fused quartz envelopes and are ordinarily in the form of long tubes having an electrode at each end. Preferred medium pressure mercury lamps have outputs ranging from about 200 to about 600 watts per inch (about 79 to about 237 watts per centimeter) across the length of the tube.

Unlike ionizing radiation, actinic radiation does not possess sufficient energy to produce ions in a medium such as air or water. Accordingly, it is necessary to use formulation additives (e.g., photoinitiators and/or photosensitizers) therewith to initiate the polymerization process.

Photoinitiators and/or photosensitizers (individually and collectively referred to hereinafter as "photoinitiators") are typically present in those coating compositions prepared in accordance with this invention which are designed to be cured by actinic radiation since they provide high energy free radicals following radiation. These free radicals, in turn, initiate the polymerization process.

When utilized in the coating compositions of this invention, photoinitiators are typically present an amount ranging from about 0.01 to about 20 weight percent, preferably from about 0.05 to about 15 weight percent, and more preferably from about 0.1 to about 10 weight percent. These weight percentages are based upon the total weight of the coating composition.

Photoinitiators which can be used to cure coating composition prepared in accordance with this invention include those having an absorption in the range from about 150 to about 2,000 nm, preferably from about 180 to about 1,000 nm, and more preferably from about 200 to about 500 nm. When employed in accordance with this invention, the photoinitiators typically comprise at least one of the following compounds: hydroxy- or alkoxy-functional acetophenone derivatives, or benzoyl diaryl phosphine oxides.

Examples of suitable photoinitiators which can be used when practicing this invention include: benzophenone, anthraquinone and thioxanthone, isobutyl benzoin ether, mixtures of butyl isomers of butyl benzoin ether, alpha, alpha-diethoxyacetophenone, alpha,alphadimethoxy-alpha-phenylacetophenone, 2-hydroxy-2-methyl-1-phenyl propane 1-one and 2,4,6-trimethyl benzoyl diphenyl phosphine oxide. Other examples of photoinitiators that can be used in the coating compositions of this invention include those set out in U.S. Pat. Nos. 4,017,652 and 5,340,653.

Another advantage of coating compositions prepared in accordance with this invention is their excellent degree of cure at relatively low doses of actinic radiation. Generally, a 1 mil (25 micron) thick wet film of a coating composition of this invention which includes a photoinitiator, can be cured through its thickness to a tack-free state upon exposure to actinic radiation by passing the film at a rate of about 20 feet per minute (about 6 meters per minute) or more under four or fewer medium pressure mercury vapor lamps operating at about 200 watts per inch (about 79 watts per centimeter) at a distance of about 4 inches (about 10 centimeters) from the surface of the wet film.

In one preferred embodiment, coating compositions prepared in accordance with this invention additionally contain a light stabilizer. One example of a particularly preferred light stabilizer is bis(1,2,2,6,6-pentamethyl-4-piperidinyl) sebacate. Such a light stabilizer is commercially available from Ciba-Geigy, Inc. as TINUVIN® 292 hindered amine light stabilizer.

Optionally, the radiation curable composition of the invention can additionally contain other ethylenically unsaturated monomers or oligomers, examples of which include: vinyl monomers such as vinyl acetate, styrene, vinyl toluene, divinyl benzene, methylvinyl ether, ethylvinyl ether and butylvinyl ether; acrylic and methacrylic esters such as methyl (meth)acrylate, ethyl (meth)acrylate, isopropyl (meth)acrylate, n-butyl (meth)acrylate, isobutyl (meth) acrylate, 2-ethylhexyl (meth)acrylate, 2-hydroxyethyl (meth)acrylate, glycidyl (meth)acrylate, ethylene glycol di(meth)acrylate, diethylene glycol di(meth)acrylate, tetraethylene glycol di(meth)acrylate, glycerol di(meth)acrylate, glycerol tri(meth)acrylate, 1,3-propylene glycol di(meth) acrylate, dipropylene glycol di(meth)acrylate, 1,4-butanediol di(meth)acrylate, 1,2,4-butanetriol tri(meth) acrylate, 1,6-hexanediol di(meth)acrylate, 1,4-cyclohexanediol di(meth)acrylate, 1,4-benzenediol di(meth) acrylate, pentaerythritol tetra(meth)acrylate, 1,5-pentanediol di(meth)acrylate, trimethylolpropane di(meth)acrylate, trinmethylolpropane tri(meth)acrylate, 2,2-dimethyl-3-hydroxypropyl-2,2-dimethyl-3-hydroxypropionate, isobornyl (meth)acrylate and tetrahydrofurfryl (meth) acrylate; (meth)acrylates derived from aromatic glycidyl ethers such as bisphenol A diglycidyl ether and aliphatic glycidyl ethers such as butanediol diglycidyl ether, specific examples of which include 1,4-butanediol diglycidylether di(meth)acrylate, bisphenol A diglycidylether di(meth) acrylate and neopentylglycol diglycidylether di(meth) acrylate; and acrylic or methacrylic amides such as (meth) acrylamide, diacetone (meth)acrylamide, N(beta-hydroxyethyl) (meth)acrylamide, N,N-bis(beta-hydroxyethyl) (meth)acrylamide, methylene bis(meth) acrylamide, 1,6-hexamethylene bis(meth)acrylamide, diethylenetriamine tris(meth)acrylamide, bis(gamma-(meth) acrylamidepropoxy) ethane and beta-(meth)acrylamide ethylacrylate.

Coating compositions of this invention can optionally contain a thermal polymerization inhibitor. Examples of suitable thermal polymerization inhibitors include phenolic compounds such as di-tertiary butyl paracresol and compounds containing secondary or tertiary nitrogen atoms.

Coating compositions of this present invention can optionally contain a solvent component. Examples of solvents which can be used for this purpose include: conventional aliphatic and aromatic solvents or diluents known in the art.

Coating compositions of this invention can optionally contain a pigment component. When it is desired to cure the composition with actinic radiation, the pigment component typically comprises pigments which do not absorb or block that portion of the light spectrum which is necessary to initiate the photocuring process. Examples of pigments which can be used in the coating compositions of this invention: talc, calcium carbonate, aluminum silicate, magnesium silicate, barytes, titanium dioxide and silica.

Although it is preferred to cure compositions of the present invention by ionizing radiation and/or actinic light, they may be thermally cured in the presence of a thermal free-radical initiator. Examples of thermal initiators suitable for this purpose include: benzoyl peroxide, methyl ethyl ketone peroxide, cumene hydroperoxide, cyclohexanone peroxide, 2,4-dichlorobenzoyl peroxide, bis(p-bromobenzoyl) peroxide, acetyl peroxide, N,N-azobis (isobutyrylnitrite), metallic dryer systems, redox systems, and the like.

Coating compositions of this invention can be in either a liquid or a solid (i.e., powder) form. These coating compositions can be applied to a variety of substrates, examples of which include: cellulosic materials (e.g., wood, paper, particleboard, chipboard), metals, metals having primers thereon, glass, plastics, metallized plastics, and the like and/or combinations thereof. Moreover, these coating compositions can be applied by a variety of procedures, examples of which include: brushing, dipping, roll coating, doctor blade coating, spraying, curtain coating, and the like and/or combinations thereof.

The examples which follow demonstrate specific embodiments of the present invention and are submitted for the purpose of illustrating features and advantages of coating compositions prepared in accordance therewith.

EXAMPLES

The following examples illustrate the preparation of components of the coating compositions prepared in accordance with this invention, as well as the coating compositions themselves. As used in the examples, all percents, ratios and parts are "by weight," unless otherwise indicated.

Example 1

Preparation of an Unsaturated Ester Compound

This example illustrates the preparation of an unsaturated ester compound which can be used in radiation curable coating compositions.

A reaction vessel equipped, with means for steam distillation and a nitrogen sparge, was charged, under agitation, with 1527.75 grams diethylene glycol, 259.5 grams butyl carbitol, 666.0 grams neopentyl glycol, 1857.0 grams fumaric acid, 2.08 grams butyl stannoic acid and 0.41 grams methyl hydroquinone The charge was gradually heated to 250° F. (121° C.) at which time a nitrogen sparge was applied. Heating was continued to a temperature of 410° F. (210° C.) while a total of 564 milliliters of distillate containing water was removed at a head temperature which did not exceed 212° F. (100° C.).

The unsaturated polyester was cooled to 189° F. (87° C.) at which time 11.20 grams dipropylene glycol tetraphenyl diphosphite and 18.7 grams triphenyl phosphite were added thereto. The charge was then held for three hours at about 190° F. (88° C.) The resulting product was an unsaturated polyester resin having an acid value of 4.6 milligrams of KOH/gram of sample, and a Gardner-Holdt bubble tube viscosity of Z4+at a 100 percent by weight solids.

Example 2

Preparation of an Optional Urethane Vinyl Ether Compound

This example illustrates the preparation of a urethane vinyl ether compound having a saturated urethane-containing polyester backbone and vinyl ether groups.

A first reaction vessel equipped with means for steam distillation and an nitrogen sparge was charged with 740 grams phthalic anhydride, 830 grams isophthalic acid, 1040 grams neopentyl glycol, 1060 grams diethylene glycol and 4.0 grams butyl stannoic acid catalyst. The charge was gradually heated to a temperature of 209° C. while a total of 605 milliliters of distillate containing water was removed.

The resulting product was a saturated polyester resin having an acid value of 1.1 milligrams of KOH/gram of sample.

This saturated polyester resin was then cooled to 36° C. at which time 368 grams of the divinyl ether of triethylene glycol was added thereto. The saturated polyester resin had a Gardner-Holdt bubble tube viscosity of Z3⁻ at 25° C.; a number-average molecular weight of 452 as determined by GPC using a polystyrene standard; and a measured hydroxyl value of 277.81 milligrams of KOH/gram of sample.

A second reaction vessel equipped with means for maintaining a blanket of nitrogen was charged at ambient temperature with 777 grams isophorone diisocyanate, 302.8 grams triethylene glycol divinyl ether, 11.0 grams triphenyl phosphite and 6.6 grams tetraphenyl dipropylene glycol diphosphite. The charge was heated under nitrogen to 105° C. over 30 minutes and held at that temperature for about 3 hours. The charge was then cooled to 60° C. over 1.25 hours. Thereafter, the vessel was allowed to cool to ambient temperature.

The charge was then heated under nitrogen to 34° C., and 0.2 grams dibutyl tin dilaurate was added thereto. Through an addition funnel, 706.8 grams of the saturated polyester resin prepared in this example were gradually added to the charge. The temperature was then gradually increases to 50° C. and held at that temperature for about 3.5 hours. Thereafter, the charge was heated to 70° C. at which time 405.5 grams of 4-hydroxy butyl vinyl ether were gradually added thereto.

The temperature was increased to 80° C. and held for 1 hour. The heat was then removed from the charge. The resulting product was a cocurable urethane vinyl ether compound which had a Gardner-Holdt bubble tube viscosity of S⁻ at 75 percent by weight solids in propylene glycol methyl ether. Infrared spectrum analysis showed that no residual isocyanato functionality remained therein.

Example 3

A Post-Reaction Treatment of the Optional Urethane Vinyl Ether Compound with a Reducing Agent This example illustrates a post-synthesis treatment of the urethane vinyl ether compound of Example 2 with reducing agent.

The saturated urethane vinyl ether compound from Example 2 was treated with a reducing agent. In this example, the reducing agent was added at the end of the reaction rather than in the second reaction vessel. Specifically, after the reaction was completed and infrared spectrum analysis confirmed that no isocyanato functionality remained in the resulting urethane vinyl ether, the charged vessel was heated to 70° C., at which time 11.0 grams triphenyl phosphite and 6.6 grams tetraphenyl dipropylene glycol diphosphite were added thereto. The charge was then gradually heated to 100° C. and held at that temperature for about 3 hours.

Examples 4 and 5

Preparation and Curing of Coating Compositions of the Present Invention

Examples 4 and 5 represent coating compositions prepared in accordance with the present invention. Example 4 represents a coating composition suitable for cure by ionizing radiation, and Example 5 represents a coating composition suitable for cure by actinic radiation.

The coating compositions of Examples 4 and 5 were prepared by mixing the ingredients set forth in TABLE 1. In TABLE 1, the triethylene glycol divinyl ether was blended with 0.3 weight percent triphenyl phosphite and 0.5 weight percent tetraphenyl dipropylene glycol diphosphite and, thereafter, held at room termerature for at least 16 hours prior to use. These weight percentages were based upon the weight of the triethylene glycol divinyl ether. Values in TABLE 1 represent percent by weight resin solids.

TABLE 1

| Composition | Example 4 | Example 5 |
| --- | --- | --- |
| Unsaturated ester of Example 1 | 57.4 | 60.4 |
| Urethane vinyl ether of Example 3 | 20.5 | 19.4 |
| Triethylene glycol divinyl ether[1] | 17.1 | 16.3 |
| Flow modifiers[2] | 2.0 | 1.9 |
| Photoinitiator[3] | — | 5.0 |

[1] RAPI-CURE ® DVE-3 divinyl ether (triethylene glycol divinyl ether commercially available from ISP Corp.).
[2] 1.0% 2-Methoxymethylethoxypropanol, commercially available as BYK-346 flow modifier from BYK Chemie; and 1.0% organo silane, commercially as TEGO FLOW 425 flow modifier from Goldschmidt Chemicals.
[3] DAROCURE ® 1173 photoinitiator (2-hydroxy-2-methyl-1-phenyl propane 1-one commercially available from Ciba-Geigy Corp.)

Each of four samples of the composition of Example 4 (herein designated Samples 4a, 4b, 4c, and 4d) and three samples of the composition of Example 5 (herein designated Samples 5a, 5b, and 5c) were drawn down on the backside of Penopac Form 1A paper substrate (commercially available from Leneta Co.) using a Pamarco handproofer drawdown bar with a 360 dots per inch (940 dots per centimeter) roller (commercially available from Pimaco Inc.) to provide wet films having a thickness of 0.09 mil (2.3 microns). The films were then cured and subjected to a mar test and a smudge test to determine their degree of cure.

The mar tests were performed by rubbing the cured film with a comer of a commercially-available wooden tongue depressor under the pressure generated merely from the weight of the hand holding the tongue depressor. If visible scratches were produced and remained, the film was considered to be marred. The number and severity of scratches determined the degree of mar. The full range of the cure scale with regard to the mar test is as follows:

| Best Mar Results | | | | Worst Mar Results |
| --- | --- | --- | --- | --- |
| No mar | Very slight mar | Slight mar | Mar | Substantial mar |

The smudge tests were performed by wiping tile cured film with a smooth surface, such as the skin surface of a finger, under the pressure generated merely from the weight of the hand performing the smudge test. If visible indentations were made and remained, the film was considered to be smudged. The severity of the indentations determined the degree of smudge. Moreover, if, in addition to being smudged, coating physically transferred to the smooth surface performing the smudge test, the film was considered to be greasy. The full range of the cure scale with regard to smudge test is as follows:

| Best Smudge Results | | | | Worst Smudge Results | |
|---|---|---|---|---|---|
| No smudge | Very slight smudge | Slight smudge | Smudge | Substantial smudge | Greasy smudge |

TABLE 2 also sets forth the cure parameters that were used and the cure observations that were made after the cured samples were subjected to the mar test and the smudge test.

TABLE 2

| SAMPLE | CURING CONDITIONS | REMARKS |
|---|---|---|
| 4a | Electron beam (EB) in full nitrogen; at 1 megarad (MR); 200 kV, 5 mA, at 7.9 meters per minute (mpm). | No mar; no smudge. |
| 4b | EB in full nitrogen; at 1 MR; 200 kV, 5 mA, at 22.2 mpm. | No mar; no smudge |
| 4c | EB in 1500 ppm oxygen; at 3 MR; 200 kV, 5 mA, at 7.9 mpm. | No mar; no smudge |
| 4d | EB in 3000 ppm oxygen; at 3 MR; 200 kV, 5 mA, at 7.9 mpm. | Slight mar; no smudge |
| 5a | Ultraviolet light (UV) in air; 1 lamp, high power, (118 Watts/centimeter (cm)), at 30.5 mpm | No mar; no smudge |
| 5b | UV in air; 1 lamp, high power (118 Watts/cm), at 61.0 mpm. | No mar; no smudge |
| 5c | UV in air; 1 lamp, high power (118 Watts/cm), at 91.5 mpm. | Substantial mar, smudge |

The results set forth in TABLE 2 illustrate that radiation curable coating compositions prepared in accordance with this invention cure at relatively high line speeds, even when in the presence of oxygen.

Example 6, 7, 8 and 9

Radiation Curable coatings with an Optional Acrylate Component

Examples 6 through 9 represent coating compositions prepared in accordance with the present invention. Of these coating compositions, those prepared in Examples 6 and 7 include an optional acrylate component and an optional urethane vinyl ether component, and those prepared in Examples 8 and 9 only included an optional urethane vinyl ether component.

Examples 6, 7, 8 and 9 were prepared by mixing together the ingredients set forth in TABLE 3. In TABLE 3, the triethylene glycol divinyl ether was blended with 0.3 weight percent triphenyl phosphite and 0.5 weight percent tetraphenyl dipropylene glycol diphosphite and, thereafter, held at room termerature for at least 16 hours prior to use. These weight percentages were based upon the weight of the triethylene glycol divinyl ether. Values in TABLE 3 represent percent by weight resin solids.

TABLE 3

| Composition | Example 6 | Example 7 | Example 8 | Example 9 |
|---|---|---|---|---|
| Unsaturated ester of Example 1 | 49.3 | 49.9 | 58.6 | 61.6 |
| Urethane vinyl ether of Example 3 | 11.7 | 11.5 | 13.9 | 14.6 |
| Triethylene glycol divinyl ether[1] | 19.0 | 19.4 | 22.7 | 23.8 |
| Photoinitiator[2] | 4.0 | — | 4.8 | — |
| Epoxy diacrylate[3] | 16.0 | 17.0 | — | — |
| Viscosity @ 25° C. (centipoises) | — | 800 | — | 2000 |

[1]RAPI-CURE DVE-3 divinyl ether, commercially available from ISP Corp.
[2]DAROCURE 1173 photoinitiator, commercially available from Ciba-Geigy Corp.
[3]EBECRYL 3700 epoxy acrylate (the diester of a diglycidyl ether of bisphenol A commercially available from Radcure Specialties, Inc.)

Three samples of each of the compositions of Examples 6 and 8 (herein designated as Samples 6a, 6b, 6c, 8a, 8b and 8c) and four samples of each of the compositions of Examples 7 and 9 (herein designated as 7a, 7b, 7c, 7d, 9a, 9b, 9c and 9d) were drawn down using a 0.003 inch (0.08 millimeter) wirewound draw-down bar (commercially available from Paul N. Gardner Co.) on the back side of Penopac Form 1A paper substrate to give a wet film thickness of 0.15 mil (3.8 microns). The films were cured as set forth in TABLE 4. TABLE 4 also sets out level of cure observations as set out above.

TABLE 4

| SAMPLE | CURING CONDITIONS | REMARKS |
|---|---|---|
| 6a | UV in air, 1 lamp, high power; at 61.0 mpm | Slight mar; no smudge |
| 6b | UV in air, 1 lamp, high power; at 76.2 mpm | Moderate mar; no smudge |
| 6c | UV in air, 1 lamp, high power; at 91.5 mpm | Moderate mar; slight smudge |
| 8a | UV in air, 1 lamp, high power; at 61.0 mpm | Slight mar; no smudge |
| 8b | UV in air, 1 lamp, high power; at 76.2 mpm | Moderate mar; slight smudge |
| 8c | UV in air, 1 lamp, high power; at 91.5 mpm | Moderate mar; slight smudge |
| 7a | EB in 65 ppm oxygen; 1 MR, 4.0 mA at 17.7 mpm | Very slight mar; no smudge |
| 7b | EB in 50 ppm oxygen; 2 MR, 5.0 mA at 11.0 mpm | No mar, no smudge |
| 7c | EB in 1000 ppm oxygen; 3 MR, 5.0 mA, at 7.3 mpm | No mar; no smudge |
| 7d | EB in 2900 ppm oxygen; 3 MR, 5.0 mA, at 7.3 mpm | Moderate mar; no smudge |
| 9a | EB in 65 ppm oxygen; 1 MR, 4.0 mA at 17.7 mpm | Moderate mar, slight smudge |
| 9b | EB in 50 ppm oxygen; 2 MR, 5.0 mA at 11.0 mpm | No mar; no smudge |
| 9c | EB in 1000 ppm oxygen; 3 MR, 5.0 mA, at 7.3 mpm | No mar; no smudge |

The results set forth in TABLE 4 illustrate that radiation curable coating compositions prepared in accordance with this invention, with the addition of an optional acrylate component, cure at relatively high line speeds, even when in the presence of oxygen.

Examples 10, 11, 12 and 13

Radiation Curable Coatings with and without an Optional Urethane Vinyl Ether Compound Examples 10 and 11 represent coating compositions which do not contain a urethane vinyl ether compound, and Examples 12 and 13 represent coating compositions which do contain a urethane vinyl compound. A comparison of Examples 10 and 12 and a comparison of Examples 11 and 13 demonstrate an improved cure response and oxygen tolerance for those radiation curable coating compositions which contain a urethane vinyl ether compound.

The coating compositions of Examples 10, 11, 12 and 13, were prepared by mixing together the ingredients in TABLE 5. In TABLE 5, the triethylene glycol divinyl ether was blended with 0.3 weight percent triphenyl phosphite and 0.5 weight percent tetraphenyl dipropylene glycol diphosphite and, thereafter, held at room termerature for at least 16 hours prior to use. These weight percentages were based upon the weight of the triethylene glycol divinyl ether. Values in TABLE 5 represent percent by weight resin solids.

TABLE 5

| Composition | Example 10 | Example 11 | Example 12 | Example 13 |
| --- | --- | --- | --- | --- |
| Unsaturated ester of Example 1 | 68.6 | 65.1 | 60.4 | 57.4 |
| Urethane vinyl ether of Example 3 | — | — | 20.5 | 19.4 |
| Triethylene glycol divinyl ether[1] | 29.4 | 27.9 | 17.1 | 16.3 |
| Photoinitiator[2] | — | 5.0 | — | 5.0 |
| Flow modifiers[3] | 2.0 | 2.0 | 2.0 | 1.9 |

[1]RAPI-CURE ® DVE-3 divinyl-ether, commercially available from ISP Corp.
[2]DAROCURE ® 1173 photoinitiator, commercially available from Ciba-Geigy Corp.
[3]1.0% 2-Methoxymethylethoxypropanol, commercially available under the trade designation BYK-346 flow modifier from BYK Chemie; and 1.0% organo silane, commercially available under the trade designation TEGO FLOW 425 flow modifier from Goldschmidt Chemicals.

Samples of each composition of Example 10, 11, 12 and 13 were drawn down on the backside of Penopac Form 1A paper substrate using a Pamarco handproofer draw-down bar with a 360 dots per inch roller to provide wet films having a thickness of about 0.09 mil (2.3 microns). The films were cured as set forth in TABLE 6. TABLE 6 also sets out level of cure observations as set out above.

TABLE 6

| Sample (UV Cure) | Run 1: 4.6 mpm; 79 Watts/cm; 3 lamps, full power | Run 2: 18.3 mpm; 79 Watts/cm; 1 lamp, full power | Run 3: 25.4 mpm; 79 Watts/cm; 1 lamp, full power |
| --- | --- | --- | --- |
| Example 11 | No mar; no smudge | Substantial mar; smudge | Substantial mar; greasy |
| Example 13 (Invention) | No mar; no smudge | Slight mar; no smudge | Substantial mar; Very slight smudge |

| Sample (EB Cure) | Run 1: 3 MR; full power | Run 2: 3 MR; 800 ppm oxygen | Run 3: 3 MR; 1800 ppm oxygen |
| --- | --- | --- | --- |
| Example 10 | No mar; no smudge | Mar; no smudge | Substantial mar; smudge |
| Example 12 (Invention) | No mar; no smudge | Mar; no smudge | Substantial mar; very slight smudge |

The results set forth in TABLE 6 illustrate an improved cure rate at high line speeds under UV cure conditions and an improved oxygen tolerance under EB cure conditions exhibited by radiation curable coating compositions prepared in accordance with this invention.

Examples 14, 15, 16 and 17

Preparation and Curing of Coating Compositions of the Invention and Comparative Coating Compositions with No Treatment with Reducing Agents These examples illustrate the preparation and curing of stabilized coating compositions of the present invention and comparative coating compositions having no treatment with reducing agents. The coating compositions, Examples 14, 15, 16 and 17, were prepared by mixing the ingredients set forth in TABLE 7.

The unsaturated ester compound in Examples 14, 15, 16 and 17 was the same as that in Example 1 with the exception that there was no dipropylene glycol tetraphenyl diphosphite or triphenyl phosphite added thereto.

Examples 16 and 17 were prepared by first mixing each of components (1) and (2) of TABLE 7 with 0.5% triphenyl phosphite and 0.5% tri-iso-decyl phosphite and allowing these reducing agents to decompose any oxidizing contaminants which were present therein. Thereafter, the treated components were blended with the remaining ingredients as set forth in TABLE 7.

TABLE 7

| | Composition | Example 14 | Example 15 | Example 16 | Example 17 |
| --- | --- | --- | --- | --- | --- |
| (1) | Unsaturated ester of Example 1 | 50.8 | 53.3 | 50.3 | 52.8 |
| (2) | Triethylene glycol divinyl ether[1] | 4.8 | 5.0 | 4.7 | 4.9 |
| (3) | Urethane vinyl ether of Example 2 | 39.6 | 41.7 | 39.3 | 41.3 |
| (4) | Photoinitiator[2] | 4.8 | — | 4.7 | — |

TABLE 7-continued

| Composition | Example 14 | Example 15 | Example 16 | Example 17 |
|---|---|---|---|---|
| (5) Triphenyl phosphite | — | — | 0.5 | 0.5 |
| (6) Tri-iso-decyl phosphite | — | — | 0.5 | 0.5 |

[1]RAPI-CURE ® DVE-3 divinyl ether, commercially available from ISP Corp.
[2]DAROCURE ® 1173 photoinitiator, commercially available from Ciba-Geigy Corp.

The coating compositions prepared above were then cured and tested. Examples 14 and 16 were subjected to a UV curing process and Examples 15 and 17 were subjected to an EB curing process. These curing process and the observed results are set out in TABLE 8. TABLE 8 also sets out level of cure observations as set out above.

TABLE 8

| EXAMPLE | UV CURE (61 mpm; 1 bulb; 118 Watts/cm) | EB CURE (1,800 ppm $O_2$) | EB CURE (3,500 ppm $O_2$) |
|---|---|---|---|
| Example 14 | Very slight mar, no smudge | — | — |
| Example 16 (Invention) | No mar; no smudge | — | — |
| Example 15 | — | Substantial mar; Very slight smudge | Substantial mar; smudge |
| Example 17 (Invention) | — | No mar; no smudge | Mar; no smudge |

The results set forth in the above TABLE 8 illustrate an improved cure response and oxygen tolerance of stabilized radiation curable coating compositions of the present invention when blended with reducing agents.

It is evident from the foregoing that various modifications, which are apparent to those skilled in the art, can be made to the embodiments of this invention without departing from the spirit or scope thereof. Having thus described the invention, it is claimed as follows.

We claim:

1. A stabilized radiation curable coating composition comprising a resin component, wherein said resin component consists essentially of:
  (a) an unsaturated ester compound having a plurality of unsaturated ester groups per molecule treated with a reducing agent comprising an organic phosphite, and
  (b) a polymerizable vinyl ether compound which is free-radically reactive with the unsaturated ester compound, which is treated with a reducing agent comprising an organic phosphite, said vinyl ether compound comprises a reaction product of a di-, tri-, or tetra-functional polyol and acetylene, and said vinyl ether compound comprises at least one of the following:
    (i) a compound having an average of greater than 1.0 reactive vinyl ether groups per molecule, and
    (ii) a vinyl ether-containing group bonded to the unsaturated ester compound such that there is an average of at least 1.0 reactive vinyl ether group per molecule,
wherein the unsaturated ester compound and the vinyl ether compound are each treated with the reducing agent before the unsaturated ester compound and the vinyl ether compound are mixed together, and wherein said reducing agent comprising an organic phosphite decomposes at least some of any oxidizing agents present in said unsaturated ester compound, said vinyl ether compound, or a mixture thereof that would initiate polymerization of the vinyl ether compound prior to being exposed to radiation.

2. The composition of claim 1 wherein the ratio of carbon—carbon double bond equivalents from said vinyl ether groups of the vinyl ether compound to carbon—carbon double bond equivalents from said unsaturated ester compound is in a range of from 0.1:1.0 to 1.5:1.0.

3. The composition as recited in claim 2 wherein the ratio of carbon—carbon double bond equivalents of said vinyl ether groups of the vinyl ether compound to carbon—carbon double bond equivalents of said unsaturated ester compound is in a range of from 0.25:1.0 to 1.1:1.0.

4. The composition as recited in claim 2 further comprising a thermal polymerization inhibitor.

5. The composition as recited in claim 2 wherein said unsaturated ester compound comprises an unsaturated polyester polymer having a peak molecular weight, as measured by gel permeation chromatography using a polystyrene standard, in a range of from about 500 to about 50,000.

6. The composition as recited in claim 5 wherein said unsaturated ester compound comprises an unsaturated polyester polymer having a peak molecular weight, as measured by gel permeation chromatography using a polystyrene standard, in a range of from 700 to 10,000.

7. The composition as recited in claim 1 further comprising a photoinitiator.

8. The composition as recited in claim 1 wherein the unsaturated ester compound comprises the reaction product of a polyhydric alcohol with an unsaturated carboxylic acid selected from the group consisting of maleic acid, fumaric acid, and itaconic acid.

9. The composition as recited in claim 8 wherein the unsaturated ester compound includes a plurality of unsaturated ester groups selected from the group consisting of: maleate groups, fumarate groups and itaconate groups.

10. The composition of claim 1 wherein the unsaturated ester compound contains a plurality of fumarate groups.

11. The composition as recited in claim 1 wherein the vinyl ether compound is selected from the group consisting of: tripropylene glycol divinyl ether, diethylene glycol divinyl ether, 1,4-butanediol divinyl ether, tetraethylene glycol divinyl ether, triethylene glycol divinyl ether, trimethylol propane trivinyl ether, polytetrahydrofuran divinyl ether and mixtures thereof.

12. The composition as recited in claim 1 wherein said organic phosphite comprises at least one compound selected from the group consisting of: dimethyl-phosphite, dioctyl-phosphite, diphenyl-phosphite, tri-octyl-phosphite, tri-decyl phosphite, tri-stearyl phosphite, trimethyl phosphite, tri-ethyl phosphite, tri-isopropyl phosphite, tris-allyl phosphite, didecyl-phenyl phosphite, tri-phenyl phosphite, tris-4-nonylphenyl phosphite, tris-4-chlorophenyl phosphite, tri-laurylthio phosphite, and tetraphenyl dipropylene glycol diphosphite.

13. The composition as recited in claim 1 wherein each of said unsaturated ester compound and said vinyl ether compound is treated with a reducing agent comprising an organic phosphite to decompose at least 50% of any oxidizing agents